(No Model.) 3 Sheets—Sheet 3.
M. D. BEARDSLEE.
MACHINE FOR CLEANING GRAIN.
No. 315,996. Patented Apr. 21, 1885.
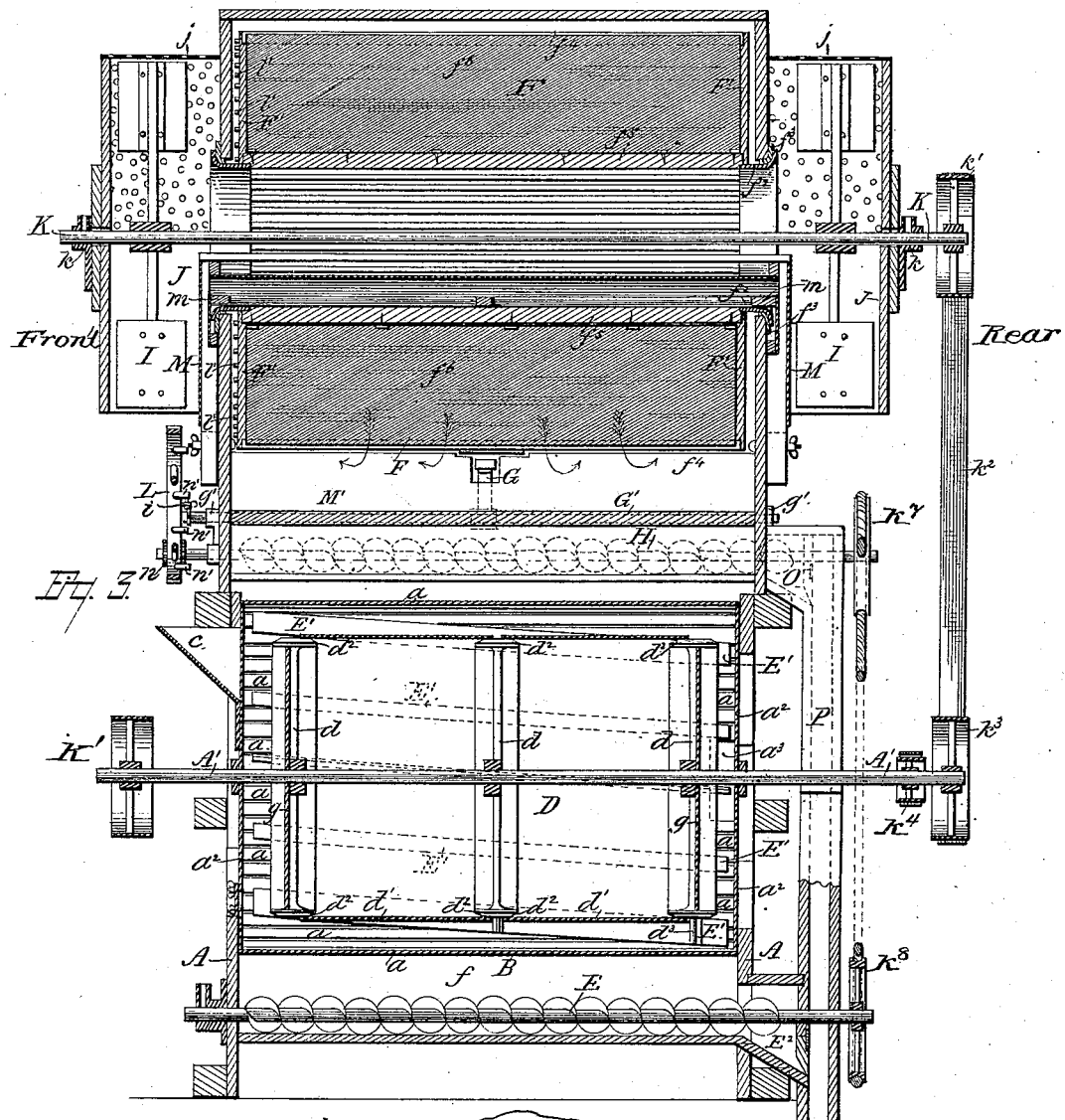
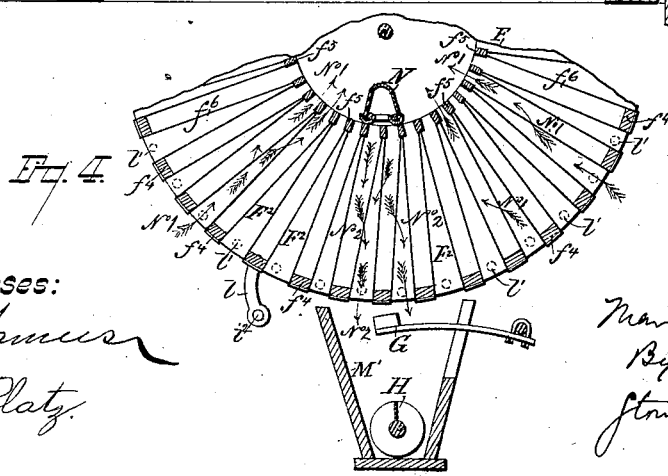
Witnesses:
E. G. Ames
R. Platz
Inventor:
Marcus D. Beardslee
By
Stout & Underwood
Attorneys.

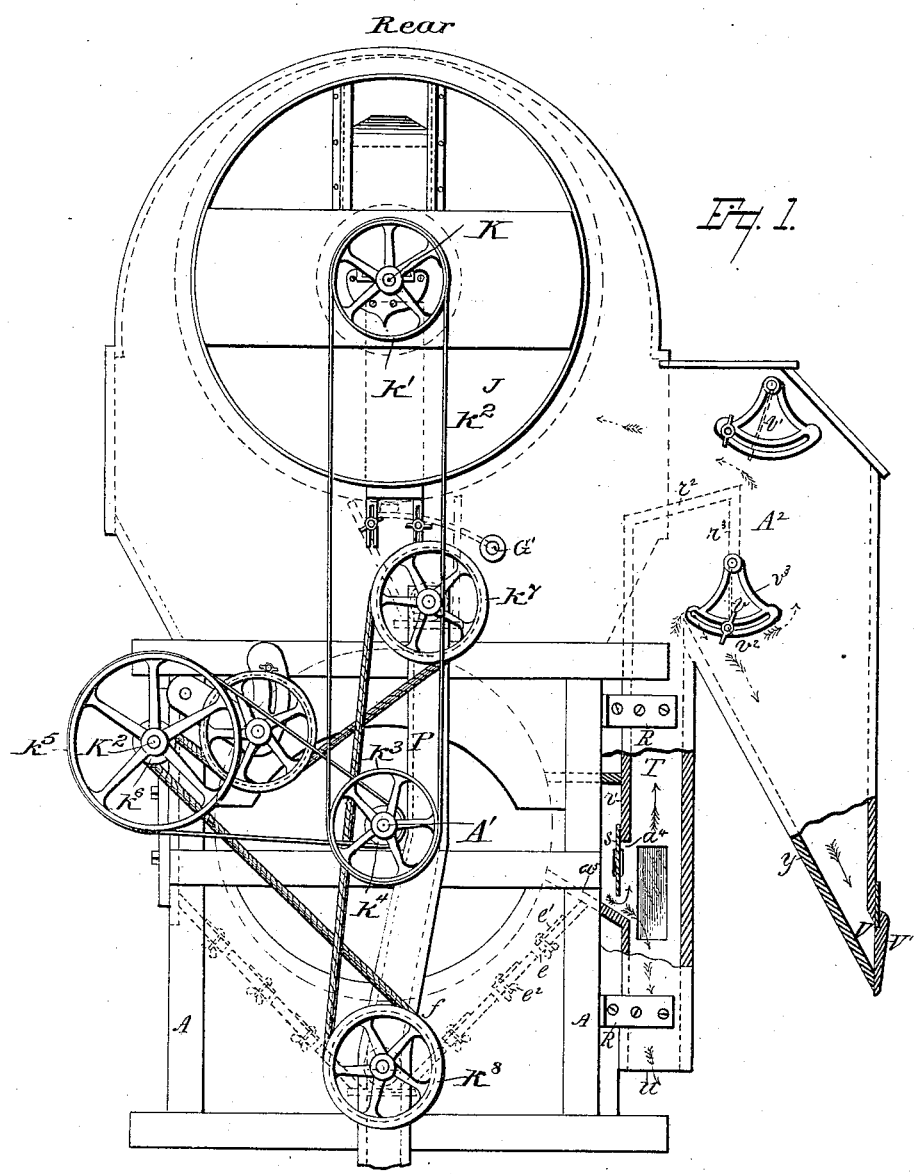

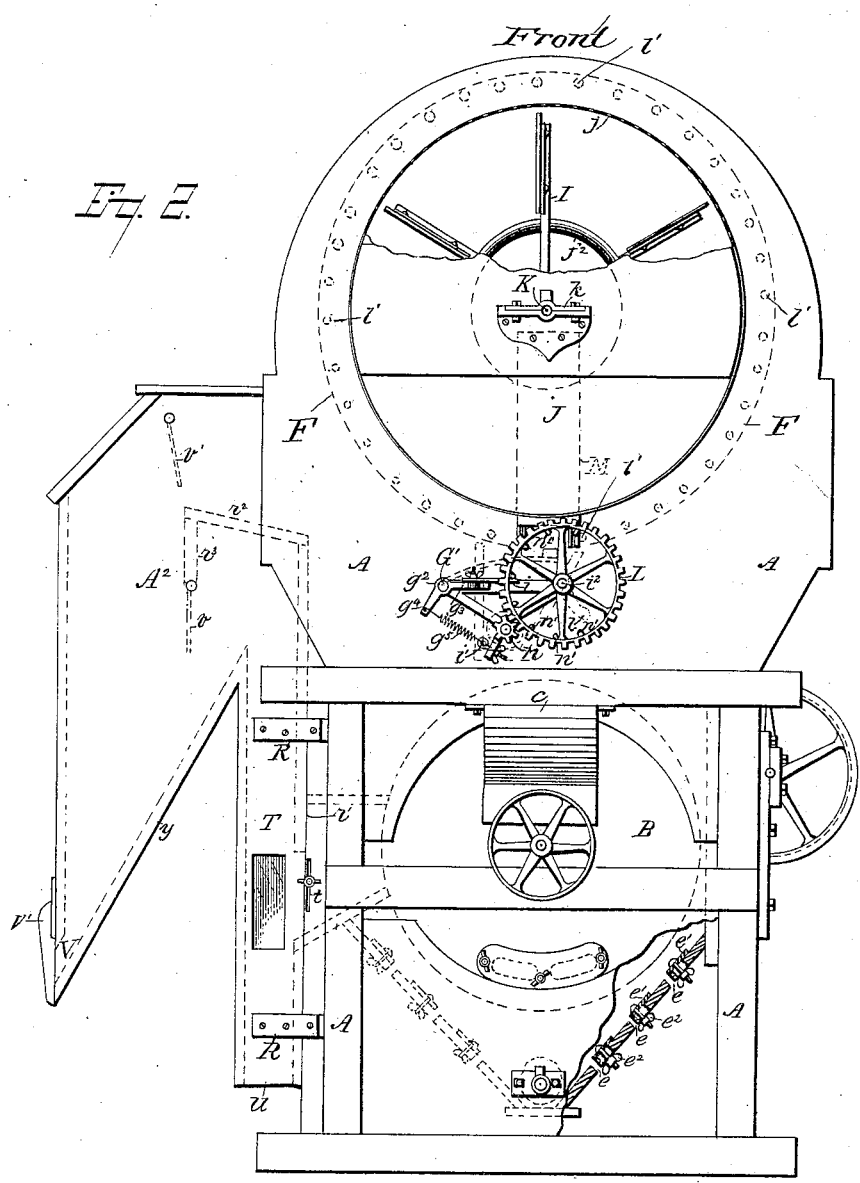

UNITED STATES PATENT OFFICE.

MARCUS D. BEARDSLEE, OF MILWAUKEE, WISCONSIN, ASSIGNOR TO THE MILWAUKEE DUST COLLECTOR MANUFACTURING COMPANY, OF SAME PLACE.

MACHINE FOR CLEANING GRAIN.

SPECIFICATION forming part of Letters Patent No. 315,996, dated April 21, 1885.

Application filed January 23, 1884. (No model.)

*To all whom it may concern:*

Be it known that I, MARCUS D. BEARDSLEE, of Milwaukee, in the county of Milwaukee, and in the State of Wisconsin, have invented certain new and useful Improvements in Machines for Cleaning Grain; and I do hereby declare that the following is a full, clear, and exact description thereof.

My invention relates to machines for cleaning grain; and it consists in peculiar devices, whereby a grain-scourer, for improvements in which I have this day filed an application for Letters Patent, is combined with the well-known dust-collector forming the subject of Letters Patent No. 272,473 and No. 272,474, granted to Faustin Prinz, of the city of Milwaukee, Wisconsin, under date of February 20, 1883.

In the drawings, Figure 1 is a rear elevation of my machine. Fig. 2 is a front elevation. Fig. 3 is a central vertical section in side elevation of the same, and Fig. 4 is a detail.

A A indicate the casing of my combined machine, in the lower part of which is located the grain-scourer, consisting of the stationary drum B, formed of the spaced staves $a$ and heads $a^2$, and of the revolving drum D. This latter is composed of the driving-shaft A' suitably journaled in the main frame of the spider-disks $d\ d\ d$, fastened onto the said shaft by means of suitable bolts or keys, of the metallic disks $g\ g$, fastened onto the end spider-disks, $d\ d$, and of the cylinder-sections $d'\ d'$. These sections are firmly held around the flanges $d^2\ d^2$, formed on the outer rims of the disks $d\ d\ d$, and projecting horizontally on each side of the same, the said flanges being beveled on their outer faces to receive the edges of the cylinder-sections, which are forced up in position around them and held firmly thereon after the spider-disks have been fastened onto the driving-shaft A'. Between the revolving drum D thus formed and the stationary drum B a certain air-space is left both at the ends and the periphery, and in this air-space travel the beaters E', which are fastened onto the front edges of the supporting-studs $d^3\ d^3\ d^3$, formed on the outer rims of the spider-disks and projecting radially outward toward the staves of the stationary drum. The beaters are attached to the studs in any suitable manner, and so as to lie at a slight angle to the vertical plane of the drum and form spirals around its periphery to propel the grain from its receiving-point—the hopper $c$—to the opposite end of the drum B. An opening, $a^3$, cut into the staves of this latter close to the rear head, $a^2$, and horizontally opposite the driving-shaft A', serves to discharge the grain. Obviously, the beaters must project beyond the revolving drum ends, so as to come in contact with the grain the moment it is dropped in the air-space at the hopper end of the machine, and to raise the same clean up and opposite the opening $a^3$ at the outlet end. Below this latter, and running in proper bearings of the casing A in the bottom of the trough $f$, is a screw-conveyer, E, to carry the dirt to the spout $E^2$. In the sides of the trough $f$ longitudinal openings $e\ e$ are provided, the same to be controlled by the adjustable slides $e'$, serving to regulate the draft induced through the machine. The opening $a^3$ in the staves of the stationary drum B leads through a bottom inclined spout, $a^5$, (shown partly in dotted lines and partly in section in Fig. 1,) into the leg or flue T, forming the lower part of the screening-box $A^2$. This latter, made of any suitable shape, is fastened on the side of the casing A by means of the brackets R R, and in the opening $a^4$, made in the inner wall of said leg or flue T opposite the spout $a^5$, is suitably mounted a sliding door, $s$, which may be adjusted as desired by means of a bolt and nut working in a slot shown at $t$, Fig. 2.

As the scoured grain is ejected out of the stationary drum B it slides down through the spout $a^5$ and runs out of the machine through the lower open end $u$ of the flue T, while the light grain or screenings and the dust are drawn up the said flue T. The inner wall, $r'$, of said flue T is extended upward inside the casing A to a point horizontally opposite the bottom of the dust-collector or balloon F. From the latter point a board, $r^2$, projects on a slight upward incline toward the outside of the box $A^2$, so as to cover a space about double the width of the flue T, and from the outer end of said board $r^2$ another board, $r^3$, is set parallel to the rear wall of the flue T, extending downward so far as to leave between its lower edge and the upper edge of the outer wall of said flue a space about equal to the width of the same. This may be closed more or less by the swinging door $v$, controlled by means of a bolt and hand-nut, $v^2$, and the slotted segment $v^3$, suitably hinged with said door $v$ in the lower edge of the board $r^3$. The screenings carried up the flue T toward the outside of the box $A^2$ will slide down the inclined bottom $y$ of the same through the spout V. The door V', closing this spout, is hinged so as to open out for the passage of the screenings and to remain closed when none are passing out. The dust is carried upward by the draft around through the space left open between the board $r^2$ and the top of the box $A^2$ into the dust-collector. Across this open space a door or valve, $v'$, is hung close to the top of the box $A^2$, by means of which the draft may be regulated as desired, in the same way as described above for the valve $v$.

In the upper part of the casing A is located the dust-collector, which mainly consists of the balloon F, the knocker G, the screw-conveyer H, and the suction-fans I I. F' F' are the heads of the balloon, and these heads have central openings, around the edges of which are fastened in any suitable manner L-shaped rings $f^2$, which are adapted to fit loosely inside of similarly-shaped rings $f^3$, that are suitably fastened around the edges of circular openings made in the front and rear ends of the casing A. By means of these rings $f^2$ and $f^3$ suitable bearings are provided, upon which the dust-collector balloon F is made to revolve, by means hereinafter described, as well as a device secured whereby the air-space left between the heads F' F' of the balloon F and the casing A is entirely closed. The edges around the central openings of the heads F' F' are connected to each other by small wooden bars or ribs $f^5$, arranged parallel to each other, and with equal-sized spaces between them. The outer rims of the heads F' F' carry the bars or ribs $f^4 f^4 f^4$ equal in number to the bars $f^5$, and around these ribs $f^4 f^4$ and $f^5 f^5$ is wound back and forth the cloth $f^6$, whereby the pockets $F^2$ of the balloon F are formed.

Covering the central openings of the balloon and casing, and extending above and below them, are the circular boxes J J, suitably fastened to the sides of the casing A and inclosed by the sheet-metal perforated hoods $jj$, and in these boxes J suction-fans I I are mounted on shaft K, journaled in suitable bearings, $k k$, on the outer ends of said boxes J J. These fans serve to draw the air from inside the casing A through the cloth of the balloon F, and are driven through the pulley $k'$, keyed on the outward projecting end of shaft K, and connected by the belt $k^2$ with the pulley $k^3$ of the driving-shaft A'.

The knocker G is bolted to the center of the shaft G', which has suitable bearings at $g'$ in the sides of the casing A. On its front end, which projects out from said casing, is keyed the bell-crank lever $g^2$, on the horizontal arm $g^3$ of which is carried, by an adjustable bolt, the vibrator $i$, while the end of the arm $g^4$ of said bell-crank is connected by the spring $g^5$ to the eye of the adjusting-bolt $i'$, suitably fixed in the casing. Running in suitable bearings of the casing is the short stem $i^2$, which carries on its outside end the cogged wheel L, and on its inside end the arm $l$. (Shown in dotted lines in Fig. 2, and in full lines of Fig. 4.) The cogged wheel L meshes with the small pinion $n$, carried on the corresponding end of the conveyer-shaft H. On the inner face of said cogged wheel L are carried the horizontal pins $n'$, which, as the wheel is revolved, come in contact with the upper face of the vibrator $i$ and depress it with the knocker G against the spring $g^5$ until said vibrator is released, when the knocker rebounds against the rib $f^4$ of the balloon with more or less force, according to the adjustment given to the spring by the hand-nut of the bolt $i'$. These pins $n'$ are distributed at an equal distance from each other, except on a part of the cogged wheel equal to the space covered by three of said pins. When this part of the wheel passes by the vibrator $i$, the knocker remains undisturbed, while the arm $l$, keyed on the inside end of the stem $i^2$, will engage with either one of the pins $l'$, projecting from the outer face of the head F' of the balloon, to rotate this latter one step, equal to the width of a pocket, $F^2$. The cogged wheel L thus serves to impart an intermittent motion to the balloon, and to operate the knocker, which, by its repeated blows against the pockets as they are brought in turn above it, will free them from the dust and dirt collected by the cloth. The pockets $F^2$, as they are brought in turn under the action of the knocker, are entirely cut off from the main draft induced by the fans through the balloon. This is done by the means of the inverted U-shaped tube N, open at its ends and properly supported in the lower part of the central space of the balloon on the bridge-bars $m m$, fastened on the inside faces of the vertical adjustable flues M M. The lips of the tube N are fitted with cushions of elastic material, and form a close joint with the edges of the ribs $f^5$ of the balloon. In this manner the main draft (indicated by the arrows No. 1) is excluded from the pockets as they are cleaned by the knocker, while a back draft is produced through the tube N and down into the pockets, as shown by the arrows No. 2. The dust falls in the trough M' of the screw-conveyer H, and is discharged at the rear end of the machine through the spout O, which opens into the vertical chute P, provided on the outer face of the casing, and which serves as an outlet of the lower conveyer, E.

The drum D is rotated with the shaft A' by means of the pulley K', which may be connected through ordinary belting with the source of power. Another pulley, $k^3$, keyed onto the opposite end of the shaft A', and connected through the belt $k^2$ to the pulley $k'$, carried on the end of the shaft K, serves to drive the fans I I. Close beside the pulley $k^3$ a small pulley, $k^4$, is keyed onto the shaft A', and this is belted to the pulley $k^5$, carried on the counter-shaft $K^2$, journaled in suitable brackets of the casing. A small grooved pulley, $k^6$, keyed onto the said counter-shaft, is connected in any suitable manner to the grooved pulleys $k^7$ $k^8$, that are respectively fastened onto the conveyer-shafts, and drives the same, and through the small pinion $n$, carried on the opposite end of the upper conveyer-shaft, H', and meshing with the cogged wheel L, the balloon F is revolved, as stated above.

Having thus described my invention, what I claim as new, and desire to secure by Letters Patent, is—

In a grain-scourer and dust-collector, the stationary drum B, the revolving drum D, screw-conveyers E and H, and driving-connections, substantially as described, in combination with the balloon F, suction-fans I I, knocker G, inverted U-shaped flue N, vertical adjustable flues M M, and the connecting-box $A^2$, substantially as shown and described, and for the purpose set forth.

In testimony that I claim the foregoing I have hereunto set my hand, at Milwaukee, in the county of Milwaukee and State of Wisconsin, in the presence of two witnesses.

MARCUS D. BEARDSLEE.

Witnesses:
S. S. STOUT,
H. G. UNDERWOOD.